June 25, 1935.  R. S. ELBERTY, JR  2,005,891
VALVE OPERATED MECHANISM
Filed Sept. 27, 1933  2 Sheets-Sheet 1
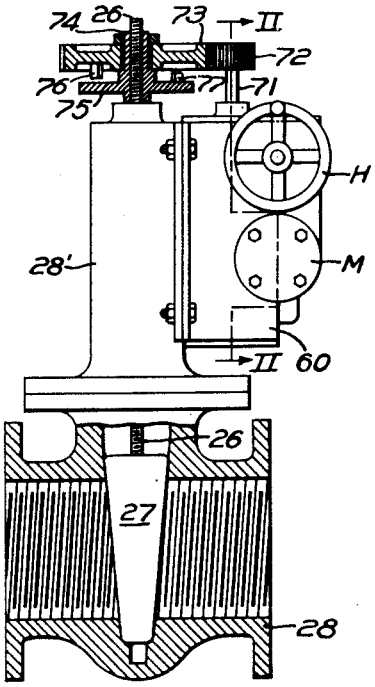
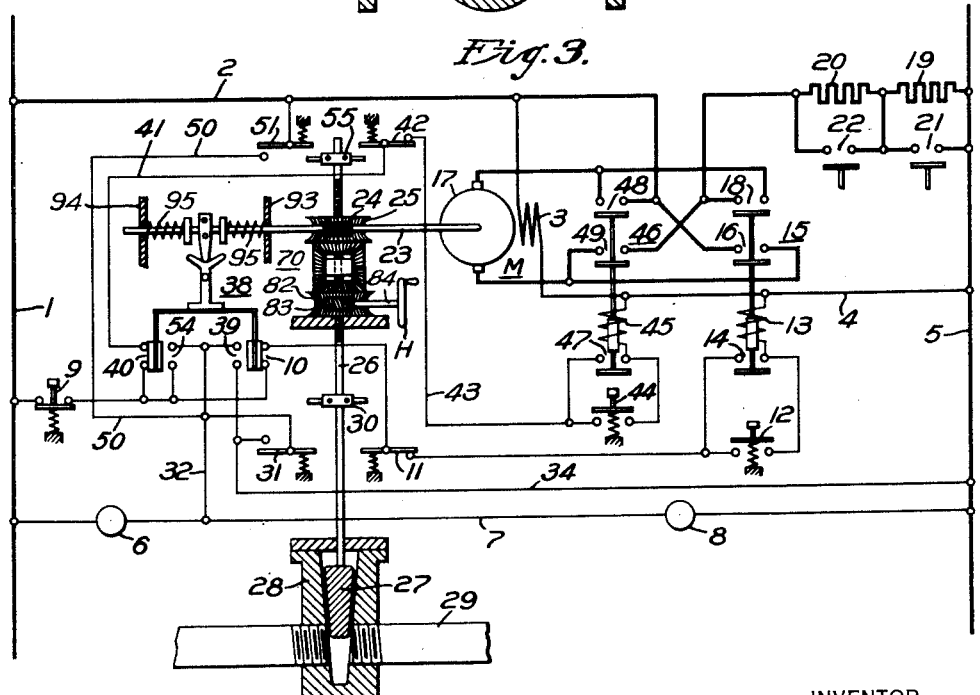
WITNESSES:
P. J. Fitzgerald
Paul E. Friedemann
INVENTOR
Robert S. Elberty Jr.
BY
W. R. Coley
ATTORNEY Patented June 25, 1935

2,005,891

UNITED STATES PATENT OFFICE 2,005,891

VALVE-OPERATED MECHANISM

Robert S. Elberty, Jr., Wilkinsburg, Pa., assignor to Westinghouse Electric & Manufacturing Company, East Pittsburgh, Pa., a corporation of Pennsylvania Application September 27, 1933, Serial No. 691,158

8 Claims. (Cl. 172—239)

My invention relates to improvements in regulating apparatus, and has particular relation to means by which the position of a valve, gate, bridge, or other device, or member, may be controlled both by an electric motor and by manually operable means.

One object of my invention is to provide for controlling the position of a member through a differential means, subject to manually operable means and motor operated means.

Another object of my invention is to control the position of a valve, for both movement in the opening direction and movement in the closing direction, selectively in response to position limit means and in response to torque limit means.

A further object of my invention is to selectively control the operation of a valve by manually operated means and motor operated means, operable either independently or concurrently.

A still further object of my invention is to control the position of a motor-driven element selectively by means responsive to the position of the element or by means responsive to the torque of the motor, or both.

Other and broader objects and also the advantages of my invention will become more apparent from a study of the following specification, when taken in conjunction with the accompanying drawings, in which:

Figure 1 is a side elevational view, partly in section, of a valve provided with my combination of differential, electrical control, motor, and manual operating means;

Fig. 3 includes a schematic showing of the mechanical features of my invention and a diagrammatic showing of the electrical features of my invention.

Figure 2:
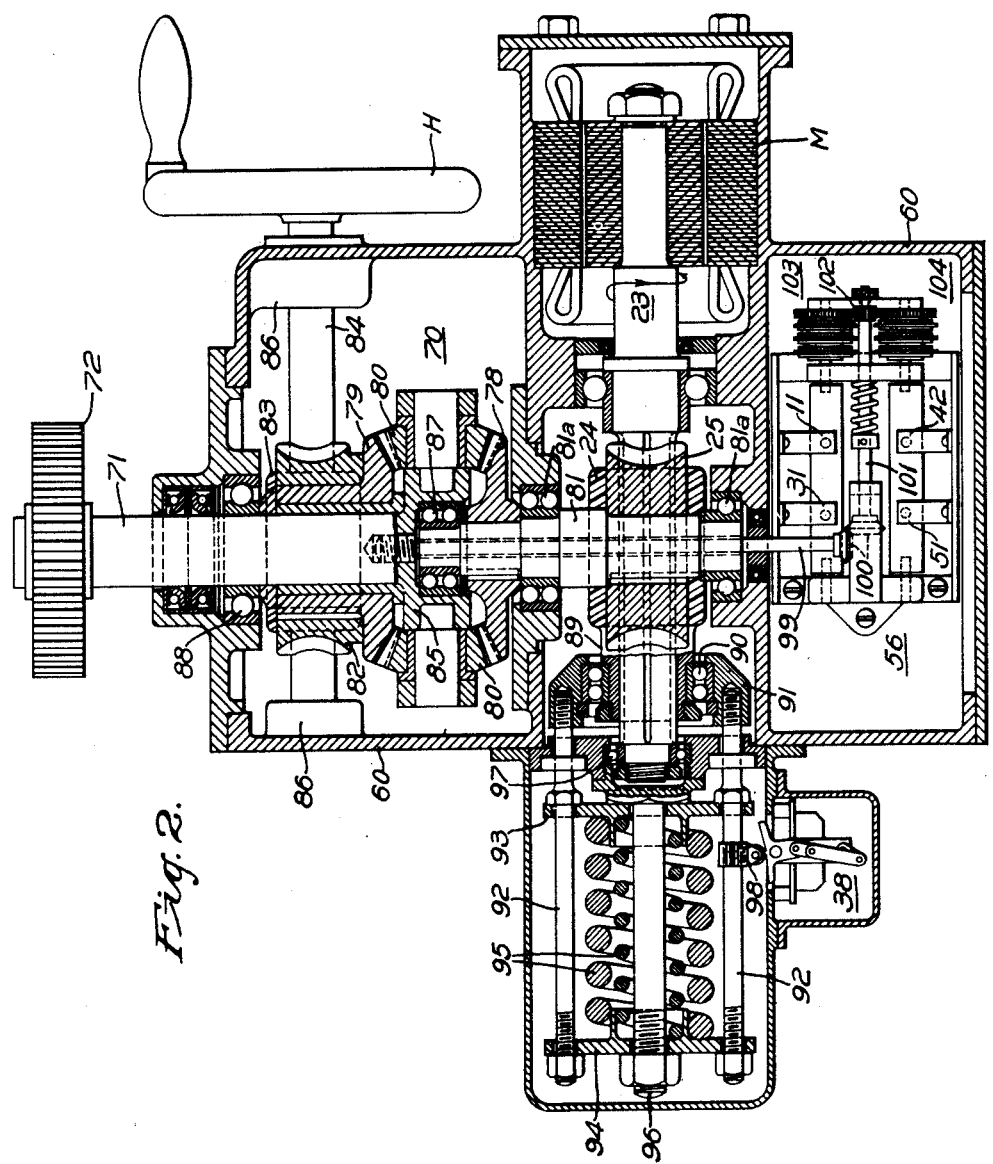
Fig. 2 is an enlarged substantially vertical section of the embodiment of my invention shown in Fig. 1, taken along the broken line II—II, in order to show as many of the improvements of my invention as can be shown in one view.

The motor controlling device in combination with the differential gear comprising my invention is capable of a variety of uses, but, for convenience, I have elected to show the invention, in the accompanying drawings, as applied to the control of a gate-valve-operating means.

In the drawings, referring particularly to Fig. 1, a casing 60 is provided for enclosing certain of the operative parts of an electrical control, a differential, and a motor. The casing 60 is suitably secured to a casing 28' housing the stem 26 of a gate or valve 27 disposed to cooperate with the valve seat in the housing 28.

The improvements of my invention provide for a combination drive for a valve or gate 27 by means of a motor M and a hand wheel H. The motor, through an irreversible mechanism, drives the sun gear 78 of a differential gear 70 (see Fig. 2), while the hand wheel H is coupled to drive, through an irreversible mechanism, the other sun gear 79 of the differential gear 70.

The planet gears 80 of the differential 70 operate a shaft 71. A gear 72 is keyed to shaft 71 and is disposed to drive a gear 73 rotatably mounted on a sleeve 74 having the disk or sector of a disk 75 mounted thereon. The gear 73 and disk 75 are provided with a pair of cooperating lugs 76 and 77, thus providing a lost-motion device intermediate gear 73 and the stem 26. When lugs 76 and 77 engage, stem 26 is caused to rotate. The disk 75 has threaded engagement with the stem 26 and thus causes the movement of gate 27 to, or from, its valve seat, depending on the direction of rotation of the gear 72.

The motor M is supplied with energy from a suitable source (not shown) which source is connected to energize the buses 1 and 5.

The motor is provided with starting switches 12 and 44 and reversing switches or directional contactors 15 and 46 associated with the respective starting switches to effect the closing of the valve 27 and the opening of the valve 27, respectively. A conventional acceleration control, including resistors 19 and 20, and accelerating contactors 21 and 22, and a stop switch 9, are also associated with the motor M.

To indicate the position of the valve 27 with reference to the pipe 29, a pair of lights 6 and 8 are utilized. Light 6 is a red light and light 8 is a green light. The light 6 is a bright red when the valve 27 is closed and light 8 is a bright green when the valve is completely open, whereas both lights are energized showing only a dim light when the valve 27 is in some intermediate or throttling position, as shown in Fig. 3.

A position-limit switch 11, disposed to be actuated by an adjustable lug 30, controls the stopping of the motor when operating to close the valve, whereas a position-limit switch 42, disposed to be actuated by adjustable lug 55, controls the stopping of the motor when operating to open the valve. The adjustment of lugs 30 and 55 is preferably such that switches 11 and 42 are actuated only when the valve is properly seated in one case and completely open in the second case. Switches 31 and 51 control the indicating lights.

A torque-limit switching means 38 responsive to the torque of the motor M controls the stopping of the motor for both the operation to close the valve 27 and the operation to open the valve 27. The lights 6 and 8 may also be controlled from the torque-limit switching means 38.

Lugs 30 and 55 are made adjustable so that the position-limit switches 11 and 42, i. e., the position-limit switching means 56, may be used to the exclusion of the torque-limit switching means 38, or the torque-limit switching means 38 may be used to the exclusion of the position-limit switching means 56. Since lugs 55 and 30 are independently adjustable, the torque-limit switching means 38 may control the closing of the valve whereas the position-limit switching means 56 may control the opening, or vice versa. In the preferred operation, the closing of the valve will be controlled by torque-limit switching means 38 whereas the opening will be controlled by position-limit switching means 56. This selective system of control for the motor, for both the closing and opening operations, provides a very efficient, flexible, and reliable system of control.

Referring more particularly to Fig. 2, motor M has a splined shaft 23, and a worm 24 is slidably mounted on the splined shaft. The worm 24 is held in a given position on the splined shaft by a spring assembly described more in detail hereinafter.

The worm 24 drives a worm wheel 25 mounted on a sleeve 81. Suitable bearings 81a are provided for the sleeve 81 and one sun gear 78 of a differential gear 70 is rigidly keyed to the sleeve 81. It should be noted that the worm 24 and the worm wheel 25 must constitute an irreversible mechanism so that any torque that might be applied to the sun gear 78 cannot drive the armature of the motor, yet the motor can readily drive the sun gear 78.

The other sun gear 79 of the differential 70 is keyed to a worm wheel 82 which meshes with a worm 83 rigidly mounted on a shaft 84 disposed to be actuated by a hand-wheel H. The planet gears 80 of the differential 70 are mounted on a spider 85 which is coupled to shaft 71 for driving the valve 27 through gears 72 and 73 and disk 75 in the manner heretofore explained.

The worm 83 and worm wheel 82 also constitute an irreversible mechanism, whereby any torque applied to sun gear 79 will not operate the hand-wheel H, yet the hand-wheel H can readily drive the sun gear.

The shaft 84 of the hand-wheel H, the shaft 71, and the spider 85 are provided with suitable bearings 86, 87, and 88 as shown. Operation of the motor may thus cause the opening or closing of the valve 27, and actuation of the hand-wheel H may also cause the opening or closing of the valve 27. The mechanical differential thus provides a very simple, and very compact as well as relatively inexpensive control for the valve.

The differential gear serves to produce from two different rotating movements a third resulting movement, proportional to the algebraic sum of the two rotating movements. With the arrangement according to my invention, it is possible for both kinds of drive, the manual drive and the motor drive, to be put into operation at the same time and the spindle 26 to revolve at a speed resulting from these two movements. Generally, this will not be the case, but only one movement will be transmitted to the spindle. Occasionally, however, a very slow throttling action of the valve may be desired, in which case the hand-wheel, while the motor is operating, will be rotated to cause a slow rotation of the spider, or when a rapid closing of the valve is desired the hand-wheel, while the motor is operating, is rotated to increase the speed of the spider.

To properly control the stopping of the motor for both the operation to close the valve and the operation to open the valve, the worm 24 is coupled to the torque-limit switching means 38 and the spider 85 is coupled to the position-limit switching means and indicating control means 56.

Worm 24 has a sleeve extension 89 mounted in the bearing 90. The bearing is fixed in the frame 91 having the rods 92 mounted to hold plates 93 and 94. A pair of springs 95 is suitably retained between the plates 93 and 94 and operate to hold the worm 24 in a given relation to the worm wheel 25. A bolt 96 is suitably secured to the casing 60 at the region of the bearing 97 for the splined shaft 23, and extends through the springs 95 and the plates 93 and 94.

If the direction of rotation of shaft 23 for the valve-closing operation is as indicated by the arrow at the motor armature shaft, the tendency of the worm 24 will be to move toward the right. Such movement toward the right in view of the positioning effect of spring 95 will, however, not take place as long as the valve 27 has not been moved to its seating position. When the valve 27 seats, the torque required to drive worm wheel 25 rises and in consequence the springs 95 are compressed and worm 24 moves toward the right.

When the valve is seated, the plate 94 is moved toward the right to compress the springs 95, and lug 98 on one of the rods 92 operates switching means 38 to stop the motor M. When the motor is operating to open the valve 27, the worm 24 moves toward the left when the valve 27 is completely opened, i. e., has moved against casing 28. The plate 93 is thereby moved toward the left and torque-limit switching means 38 are operated in another direction to also stop the motor M. For some installations, a torque-limit control 38 would suffice, but to secure added flexibility the position-limit switching means 56 are herein shown combined with the torque-limit switching means 38.

The position-limit switching means 56 comprise a shaft 99 coupled to shaft 71 driven by the spider 85. A pair of bevel gears 100 cooperate to drive shaft 101. A pinion 102 is mounted on shaft 101. This pinion 102 operates two adjustable counting mechanisms 103 and 104, for operating switches 11 and 31, and 42 and 51, respectively, The counting mechanisms 103 and 104 are of a well-known type and since they, in themselves, are not part of this invention, need not be described in detail. The counting mechanisms are, however, adjustable so that the switches 11 and 31, and 42 and 51 may be caused to operate for any selected position of the valve 27. The preferred adjustment will be such that the motor M is stopped by the position-limit switching means 56 when opening the valve and stopped by the torque-limit switching means 38 when closing the valve. This method of operation prevents damage to the valve or breakage of the connection between the spindle 26 and valve 27 in one case, and accomplishes a proper seating of the valve in the other case.

Fig. 3 is a schematic showing of the mechanical parts and a diagrammatic showing of the electrical control and does not, especially for the mechanical features, show the exact structure.

The showing, however, will serve to simplify and clarify the description.

A still better understanding of my invention can be gotten from a study of the sequence of operation of the system of control, shown in Fig. 3, for both the valve-closing and the valve-opening operations. When buses 1 and 5 are suitably energized, a circuit is established from energized bus 1 through conductor 2, field winding 3 of motor M and conductor 4 to the energized bus 5. The motor is thus fully excited before the armature 17 of the motor M is connected to the buses 1 and 5. Further, if the valve 27 be assumed to be in the intermediate position shown, a circuit is established from bus 1 through red light 6, conductor 7 and green light 8 to the bus 5. Since both lights are in series and are designed for the voltage of buses 1 and 5, both lights will be energized and show only a dim light.

If the attendant wishes to close the valve 27, he operates the starting switch 12, thereby establishing a circuit from bus 1 through the stopping switch 9, torque-limit switch 10, position-limit switch 11, starting switch 12, actuating coil 13 of the reversing switch or directional contactor 15, and conductor 4 to the bus 5. Operation of the directional contactor 15 closes contact members 14 to establish its own holding circuit and closes contact members 16 and 18 for starting the motor M to operate in a direction to close the valve 27.

The operating circuit for the motor M may be traced from bus 1 through conductor 2, contact members 16 of the directional contactor 15, armature 17, contact members 18 and resistor sections 20 and 19 to the bus 5. These named resistor sections may be shunted by switches 22 and 21 in any suitable manner to control the acceleration of the motor. Frequently these resistors are not needed at all but the motor is connected directly to the buses 1 and 5 by the respective directional contactors.

The motor, being energized, operates the worm 24 and through the worm wheel 25 and the differential 70 drives the valve 27 toward its seat. When the valve becomes seated, the torque of the motor rises rapidly and the worm is thus shifted toward the right. The torque-limit switching means 38 are thus caused to operate with the result that switch 10 opens and switch 39 closes. Opening of switch 10 interrupts the circuit for coil 13 and, in consequence, the motor circuit opens at contact members 16 and 18 and the motor comes to rest. The closing of switch 39 establishes an energized circuit through conductor 32, switch 39 and conductor 34, which energized circuit is in shunt relation to the green light 8. The light 8 is thus extinguished, whereas the red light 6, being now subject to the full voltage of the buses 1 and 5, shines with a bright red light, thus indicating that the valve 27 is closed.

Lug 30 (see Fig. 3) may of course be adjusted so that switches 11 and 31 operate either at the same time switches 10 and 39 are operated, or may be adjusted so that they operate before switches 10 and 39 are actuated. In this latter case there is obviously no torque-limit control for the valve but only a position-limit control for the valve. For the valve-closing operation torque-limit control is ordinarily preferable.

If the valve is to be opened, switch 44 is actuated, whereupon a circuit is established from bus 1 through the stopping switch 9, torque-limit switch 40, conductor 41, position-limit switch 42, conductor 43, starting switch 44 and actuating coil 45 of the reversing switch or directional contactor 46 to the energized conductor 4. Operation of directional contactor 46 closes contactor members 47, establishing a holding circuit for itself, and contact members 48 and 49, establishing a circuit for the motor to open the valve 27.

When the valve is completely open and preferably before the back of the valve moves against the case, the adjustable lug 55 actuates switches 42 and 51. Switch 42 thereupon stops the motor, whereas switch 51 through conductors 32 and 50 shunts the red light 6. The green light 8 is thus bright, indicating that the valve 27 is open. It is, of course, apparent that lug 55 may be so adjusted that the torque-limit switching means 38 may operate also when the valve opens thus actuating switches 40 and 54. The switch 40 effects the stopping of the motor, whereas switch 54 controls the circuits for the lights 6 and 8 similarly to switch 51. With my invention any control desired may be had with torque-limit switching means 38 and position-limit switching means 56.

In the foregoing description it was pointed out that the preferred control is to utilize torque-limit switching means 38 for the closing operation of the valve and position-limit switching means 56 for the opening operation of the valve, but for some applications means 38 may be used for the opening operation of the valve whereas means 56 may be for the closing operation of the valve. For still other installations means 56 may be utilized for both the closing and opening operations of the valve, and for still other installations means 38 may be utilized for both the closing and the opening operations of the valve. A very flexible yet simple combined manual and motor control through a differential is thus provided by my invention.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a system of control for a machine, in combination, a member to be operated, a motor, a mechanical differential having a plurality of elements, motor operated means constituting an irreversible mechanism and driven by said motor, disposed to drive one element of said differential, manually operable means, constituting an irreversible mechanism, for driving a second element of said differential, means for driving the said member from a third element of said differential, and control means, responsive selectively to the torque of said motor and the position of said motor operated means, and adapted to stop the operation of said motor.

2. In a system of control for a machine, in combination, a member, constituting a part of said machine, adapted to be moved between certain limits, a motor, means for energizing said motor to operate in the one or the other direction, a mechanical differential having a plurality of elements, an irreversible drive connection, comprising a worm and worm wheel, between said motor and one of the elements of said differential, manually operable means, an irreversible drive connection between said manually operable means and a second element of said differential, means for driving said member from a third element of said differential operating at a speed proportional to the algebraic sum of the operating speeds of said motor and said manually operable means, and control means, responsive selectively to a certain position of said worm and the torque of said motor, adapted to control the operation of said motor.

3. In a system of control for a machine, in combination, a member, constituting a part of said machine, adapted to be moved between certain limits of travel, a motor, means for energizing said motor to cause it to operate said member either in the one or the other direction, a differential having a plurality of elements, an irreversible mechanism interconnecting the motor and one element of said differential, reversible manually operable means, an irreversible mechanism connecting said manually operable means to another element of said differential, means for driving said member towards its respective limits of travel from a third element of said differential operable at a speed that is proportional to the algebraic sum of the speeds of the motor and manually operable means, a second member adapted to be operated by said motor, and means, responsive selectively to the position of said second member and the torque of said motor, adapted to control the operation of said motor.

4. In a system of control for a motor driven valve, in combination, a valve, a motor therefor, means adapted to energize the motor to operate either to close the valve or to open the valve, control mechanisms having a plurality of elements and a differential also having a plurality of elements, means for driving one differential element by the motor, manually operable means for driving a second differential element, means for driving the valve from a third differential element, and control means, responsive selectively to the position of one of the elements of the control mechanisms and the torque of the motor, adapted to control the operation of the motor.

5. In a system of control for motor-driven mechanisms, in combination, a member disposed to operate between certain limits of travel, a motor, manually operable means, means adapted to energize said motor to operate either in one direction or in the other direction, a device including a pair of driving gears, a driven member interconnected with said driving gears to operate as a function of the resultant effect of said driving gears, driving connections between one of said gears and said motor, driving connections between said manually operable means and the other of said gears, and driving connections between said driven member and the member operating between certain limits of travel, and control means, responsive selectively to a predetermined change of position of one of the elements included in said device and the torque of said motor, adapted to control the operation of said motor.

6. In a system of control for a member disposed to be actuated by means of manually operable means and motor-driven means, in combination, a reversible motor, a source of energy, means for connecting the motor to the source of energy to operate in either direction, a differential, an irreversible mechanism interconnected with said motor, a sun gear of said differential disposed to be driven by the motor through said irreversible mechanism, a manually operable irreversible mechanism, a second sun gear of said differential disposed to be manually actuated through said manually operable irreversible mechanism, planet gears of said differential being interconnected with said member to drive said member, and selective control means including a device operable, when said member is moved to a given position, to stop the motor, and a second device adapted to change its position when the torque of the motor is increased above a certain value, and means responsive to a predetermined change in position of said second device to effect the stopping of the motor.

7. In a system of control for a reciprocating member adapted to be manually actuated and adapted to be actuated by a motor, in combination, a motor, means for connecting the motor to operate in the one or the other direction, a differential, manually operable means, means for interconnecting the differential with said motor and manually operable means, means for driving the reciprocating member from the differential at a speed proportional to the algebraic sum of the speed of the motor and manually operable means, and selective control means including torque-limit means responsive to certain operating characteristics of the connection of the motor with said differential to cause the stopping of the motor, and position-limit means operable where said reciprocating member is in a given position to also cause the stopping of the motor.

8. In a system of control for a motor, in combination, a motor, a source of energy for the motor, means for connecting the motor to the source of energy, a differential having a pair of sun gears and a planet gear, manually operable means, a spring biased member disposed to operatively connect the motor and one sun gear and connections between the manually operable means and the other sun gear, and selective control means comprising switching means operable by said spring biased member to control the operation of the motor and means responsive to certain operations of said planet gear to also control said motor.

ROBERT S. ELBERTY, Jr.